(12) United States Patent
Arai et al.

(10) Patent No.: US 7,002,721 B2
(45) Date of Patent: *Feb. 21, 2006

(54) DISPLAY UNIT AND ITS DRIVING METHOD

(75) Inventors: Michio Arai, Kanagawa (JP); Eriko Matsui, Kanagawa (JP); Kenji Shinozaki, Tokyo (JP); Toyoharu Oohata, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/103,028

(22) Filed: Apr. 11, 2005

(65) Prior Publication Data
US 2005/0174623 A1 Aug. 11, 2005

Related U.S. Application Data

(63) Continuation of application No. 10/473,288, filed on Sep. 26, 2003, now Pat. No. 6,885,489.

(30) Foreign Application Priority Data
Mar. 30, 2001 (JP) .............................. P2001-98072
Mar. 29, 2002 (WO) ...................... PCT/JP02/03298

(51) Int. Cl.
*G02F 1/15* (2006.01)

(52) U.S. Cl. ..................................................... 359/265
(58) Field of Classification Search ......... 359/265–275
See application file for complete search history.

(56) References Cited

U.S. PATENT DOCUMENTS 4,175,836 A    11/1979  Redman et al.
5,189,549 A     2/1993  Leventis et al.
6,118,573 A     9/2000  Kubo et al.
6,211,995 B1 *  4/2001  Azens et al. ................ 359/273
6,661,563 B1   12/2003  Hayashi et al.

FOREIGN PATENT DOCUMENTS

EP      0 712 025 A2   5/1996
JP         8-221006    8/1996
JP      P2000-222881 A 8/2000

OTHER PUBLICATIONS

Patent Abstract of Japan, Publication No. 60070421, Publication Date Apr. 22, 1985.

* cited by examiner

*Primary Examiner*—Hung Xuan Dang
*Assistant Examiner*—Tuyen Tra
(74) *Attorney, Agent, or Firm*—Sonnenschein, Nath & Rosenthal LLP

(57) ABSTRACT

The invention provides an electrochromic display unit with high-quality display. The display unit comprises a transparent electrode (1), a display layer (2) which is formed on the transparent electrode (1) and which changes a color according to the amount of accumulated electrical charges, and an ion conductive layer (3) formed on the display layer (2). A plurality of picture electrodes (4) are formed on the ion conductive layer (3) on the side opposite to the display layer (2). The picture electrodes (4) are driven independently by, for example, a corresponding thin film transistors (6). In driving, by applying a drive current having given amount of electrical charges and then applying a certain amount of an inverted current, a certain amount of coloration is deducted, and extra coloration of the display layer (2) is eliminated.

1 Claim, 7 Drawing Sheets

DISPLAY UNIT AND ITS DRIVING METHOD

RELATED APPLICATION DATA

This application is a continuation of application Ser. No. 10/473,288 filed Sep. 26, 2003 now U.S. Pat. No. 6,865,489. The present and foregoing applications claim priority to Japanese Application No. P2001-98072 filed on Mar. 30, 2001, and PCT Application No. PCT/JP02/03298 filed Mar. 29, 2002. Each of these applications is incorporated herein by reference to the extent permitted by law.

BACKGROUND OF THE INVENTION

The present invention relates to a display unit suitable for a display device used for the purpose of reading documents (so-called electronic paper) and its driving method.

In these years, in connection with popularization of the network, documents which were previously distributed in the form of printed materials have been delivered in the form of so-called electronic documents. Further, books and journals are also increasingly provided in the form of so-called electronic publishing. A conventional technique used to read such information is to read the information from a CRT (cathode ray tube) or a liquid crystal display of the computer. However, it is pointed out that it is impossible to use a luminescent type display such as the CRT for long hours of reading and the like since significant fatigue is incurred based on ergonomic reasons. It is said that a non-emissive type display such as the liquid crystal display is not also suitable for reading due to flicker specific to a fluorescent tube. Further, in either case, there is a problem that a reading place is limited to where the computer is installed.

In these years, though a reflective liquid crystal display which uses no back light has been practically used, a reflectance in the case of the liquid crystal is in the range from 30 to 40%. These figures mean significantly bad visibility compared to a reflectance of the printed papers (reflectance of 75% for OA sheets and paperback books; and reflectance of 52% for newspapers). In addition, since fatigue is easy to be incurred due to dazzle by a light reflector or the like, it is impossible to use this reflective LCD for long hours of reading.

Therefore, in order to solve these problems, so-called paperlike displays or electronic papers have been developed. Display methods used for them include an electrophoretic migration method, bicolor ball display method, an electrochromic method and the like. In a display with the electrophoretic migration method (electrophoretic image display: EPID), a white pigment, a black toner and the like are layered on the electrode by the action of electric field. A display with the bicolor ball display method (twisted ball display: TBD) comprises a sphere whose half is colored in white and whose another half is colored in black, and utilizes revolutions by the action of electric field. However, since in both methods, a clearance allowing fluids to gain entry is required and closest packing is impossible, high contrast is hard to be obtained. Further, there is a problem that the practical writing speed (within 1 sec) cannot be obtained unless a drive voltage is 100 V or more. Compared to the displays using these display methods, a display with the electrochromic method (electrochromic display: ECD) is superior to the displays with the foregoing methods in terms of high contrast, and already used practically as a display for, for example, photochromic glasses and timekeepers.

However, as for the electrochromic display, in the case where characters and images are displayed by combining fine picture elements with a simple matrix drive method, there is the danger that its display quality is lowered since its contrast is uniformised due to cross talks between picture elements. Therefore, it is said that an active matrix drive method which arranges active devices such as a transistor for every picture element is desirable. For example, conventionally, an electrochromic display layer is formed on a glass substrate (TFT substrate) wherein thin film transistors (TFT) for every picture element and wiring electrodes or the like are formed. However, in such conventional construction, there is a problem that the display qualities such as luminance and contrast are lowered since the electrochromic display layer is observed from the TFT substrate side so that areas occupied by the TFT and the wiring electrode and the like become shadow.

In light of the foregoing problems, it is an object of the invention to provide a display unit using the electrochromic method which can provide high quality displays and its driving method.

SUMMARY OF THE INVENTION

A display unit of the invention comprises a transparent electrode; a display layer which is formed on the transparent electrode and change a color according to the amount of accumulated electrical charges; and an ion conductive layer which is formed on this display layer on the side opposite to the transparent electrode. In the display unit, a plurality of independent electrodes are formed on the ion conductive layer on the side opposite to the display layer.

A driving method for the display unit of the invention is the driving method for the display unit which comprises the transparent electrode; the display layer which is formed on the transparent electrode and change a color according to the amount of accumulated electrical charges; and the ion conductive layer which is formed on this display layer on the side opposite to the transparent electrode, wherein a plurality of independent electrodes are formed on the ion conductive layer on the side opposite to the display layer. In this driving method, the amount of accumulated electric charges of the display layer are controlled by selectively supplying a drive current having the amount of electric charges according to a coloration density or a coloration area between the plurality of independent electrodes and the transparent electrode, and by controlling the amount of electric charges or directions of the drive current.

In the display unit according to the invention, characters and images displayed by the display layer are viewed from the transparent electrode side, and the plurality of independent electrodes and their drive system (for example, a thin film transistor) are located on the rear side of the display layer. Therefore, a problem of shadow due to the thin film transistor or the like is resolved, and high quality displays are realized.

In the driving method for the display unit according to the invention, extra coloration (discoloration) of the display layer is decreased or eliminated even when coloration occurs since a drive current is applied all over the display layer having a common potential due to the transparent electrode or even when a drive current spreads inside of the ion conductive layer, since the amount of accumulated electric charges of the display layer are controlled by the amount of controlling electric charges or directions of the drive current.

Other and further objects, features and advantages of the invention will appear more fully from the following description.

DETAILED DESCRIPTION OF THE PRESENTLY PREFERRED EMBODIMENTS

Embodiments of the invention will be described in detail hereinbelow with reference to the drawings.

[First Embodiment]

Figure 1:
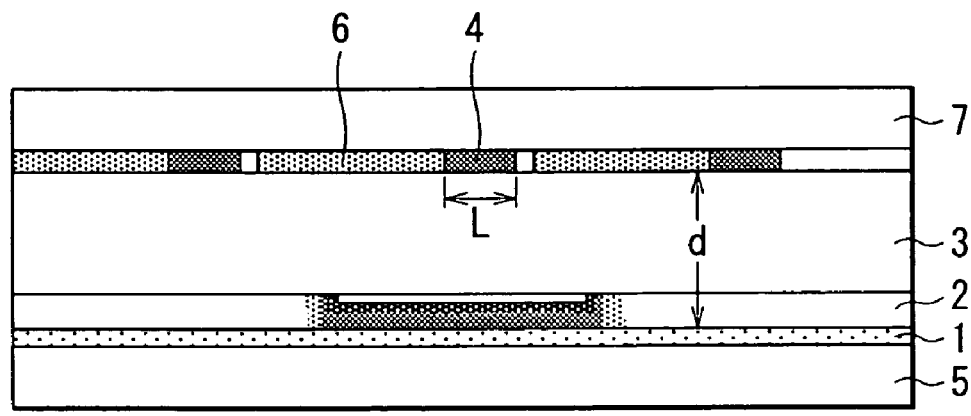
FIG. 1 is an outline cross sectional view showing a configuration example of a display unit according to a first embodiment of the invention.

FIG. 1 schematically shows a cross sectional structure of a display unit according to a first embodiment of the invention. This display unit has a construction, wherein a display layer 2 and an ion conductive layer 3 are arranged between a transparent electrode 1 formed on a transparent support 5 and a plurality of picture electrodes 4 (three picture electrodes in FIG. 1) formed on a support 7 on the rear side. The display layer 2 displays characters, images or the like by combining fine picture elements. The displayed characters, images or the like are viewed from the transparent electrode 1 side through the transparent support 5 and the transparent electrode 1. FIG. 1 shows a condition, for example, wherein a part of the display layer 2 facing a middle picture electrode 4 of the three picture electrodes 4 is colored. In addition, this display unit is driven, for example, by an active matrix method, and each picture electrode 4 is electrically connected to a thin film transistor (TFT) 6 as a corresponding active device.

The transparent electrode 1 is formed approximately all over the transparent support 5 as a common electrode. It is preferable to use, for example, a mixture of $In_2O_3$ and $SnO_2$, so-called ITO film, or a film coated with $SnO_2$ or $In_2O_3$ for the transparent electrode 1. It is possible to use the ITO film and a film coated with $SnO_2$ or $In_2O_3$ which are doped with Sn or Sb, and MgO, ZnO and the like.

As the transparent support 5, a transparent glass substrate such as a silica glass plate and a soda lime glass plate can be used, but its material is not limited to the above. Other examples for its material include ester such as polyethylene naphthalate and polyethylene terephthalate; cellulosic ester such as polyamide, polycarbonate and acetylcellulose; fuluoride polymer such as polyvinylidene fluoride and tetrafluoroethylene-hexafluoro propylene copolymer; polyether such as polyoxymethylene; polyolefin such as polyacetal, polystyrene, polyethylene, polypropylene, and methyl pentene polymer; and polyimide such as polyimide-amide and polyetherimide. In the case where these synthetic resins are used for a support, the support can be made in the form of a rigid substrate which is hard to be bent, and can be also made in the structure of a flexible film.

The display layer 2 is formed on the transparent electrode 1, and characters, images and the like are displayed by discoloring this display layer 2 corresponding to accumulated electrical charges. The display layer 2 contains, for example, an electrochromic material which is colored or discolored by electrochemical oxidation and reduction; or a material which is colored or faded by electrochemical precipitation and elution. For example, in the case that the electrochromic material which is colored or discolored by electrochemical oxidation and reduction is contained, when anion is doped by application of potential, the electrochromic material absorbs more electrons, and dignified black is displayed.

As the electrochromic material which is colored or discolored by electrochemical oxidation and reduction, a given material which shows the electrochromic character, for example, a transition metal compound such as tangstic oxide, iridium oxide and molybdenum oxide; and a rare earth diphthalo cyanine compound such as ruthenium diphthalo cyanine can be used. However, π conjugated system conductive polymer is suitable, since it can display dignified black.

Examples of π conjugated system conductive polymer include polyacetylene, poly(p-phenylene), polythiophene, poly(3-methyl thiophene), polyisothianaphthene, poly(p-phenylene sulfide), poly(p-phenylene oxide), polyaniline, poly(p-phenylene vinylene), poly(thiophene vinylene), polyperinaphthalene, nickel phthalocyanine and the like.

One of the most preferable among these π conjugated system conductive polymers is polypyrrole. The reasons for this include 1) its oxidation potential is low, 2) its coulomb efficiency is high, 3) color in oxidation is black, 4) its cycle life is long, and the like. The reason why the material having a low oxidation potential is preferred is that the material having a low oxidation potential is more stable in color condition. The fact that the material having a high coulomb efficiency is preferred represents that the material having a high coulomb efficiency can restrain a side reaction that much, namely, a high coulomb efficiency of nearly 100% means that a side reaction hardly occurs and life as a device becomes longer. The point that color in oxidation is black is an important characteristic as a display for documents. Compared to green or reddish black in other polymers, the polypyrrole provides black color during complete oxidation. Therefore, by adopting the polypyrrole, black density can be raised, and a contrast can be improved. Further, its long cycle life is one of the beneficial characteristics of the polypyrrole.

Though a material which is colored or faded by electrochemical precipitation and elution is not limited particularly, examples of the material include each ion of bismuth, copper, silver, lithium, iron, chrome, nickel, and cadmium, or combinations of these ions.

The ion conductive layer 3 is formed on the display layer 2 on the side opposite to the transparent electrode 1. The ion conductive layer 3 is arranged to provide the display layer 2 with ions (anions), and made of a polymer solid electrolyte wherein a supporting electrolyte is dispersed in a matrix polymer material. Examples of the matrix (host material) polymer include polyethylene oxide, polyethylene imine, and polyethylene sulfide, whose respective framework units are shown as —(C—C—O)n—, —(C—C—N)n—, and —(C—C—S)n—. Branched structure having the above framework unit as a main chain structure is possible. In addition, polymethyl methacrylate, polyvinylidene fluoride, polyvinylidene fluoride chloride, and polycarbonate and the like are also preferable.

When the ion conductive layer 3 is formed, it is preferable to add a required plasticizer to the matrix polymer. As a preferable plasticizer, water, ethyl alcohol, isopropyl alcohol, and mixtures of them and the like are preferable when the matrix polymer is hydrophilic; and propylene carbonate, dimethyl carbonate, ethylene carbonate, γ-butyrolactone, acetonitrile, sulfolane, dimethoxyethane, ethyl alcohol, isopropyl alcohol, dimethyl formamide, dimethyl sulfoxide, dimethyl acetamide, n-methylpyrrolidone, and mixtures of them are preferable when the matrix polymer is hydrophobic.

As described above, the ion conductive layer 3 is formed by dispersing the supporting electrolyte in the matrix polymer. Examples of the electrolyte include, for example, lithium salts such as LiCl, LiBr, LiI, $LiBF_4$, $LiClO_4$, $LiPF_6$ and $LiCF_3SO_3$; potassium salts such as KCl, KI, and KBr; natrium salts such as NaCl, NaI, and NaBr; and tetraalkyl ammonium salts such as tetraethyl ammonium fluoroborate, perchloric acid tetraethyl ammonium, tetrabutyl ammonium fluoroborate, perchloric acid tetrabutyl ammonium, and tetrabutyl ammonium halide. Alkyl chain lengths of the foregoing tetra ammonium salts can be irregular.

It is possible to add a coloring agent such as a white pigment to the ion conductive layer 3 in order to improve the contrast. As the white pigment, titanium oxide, alumina and the like can be used, and additionally, zinc oxide and the like can be also used. A mixture ratio of the white pigment is preferably in the range from about 1 to 20 wt %, and more preferably in the range from about 1 to 10 wt %, and most preferably in the range from about 5 to 10 wt %. The reason why the mixture ratio of the white pigment is limited to such ratios is that the white pigment such as titanium oxide is not soluble in polymers and is only dispersed, so that in the case that its mixture ratio is increased, the white pigment becomes aggregated, resulting in an uneven optical density. In addition, since the white pigment has no ion conductivity, increased mixture ratio causes lowering of conductivity of the polymer solid electrolyte. Considering the both reasons, the upper limit of the mixture ratio of the white pigment is about 20 wt %.

The picture electrodes 4 are provided on the ion conductive layer 3 on the side opposite to the display layer 2, corresponding to picture elements. The picture electrode 4 is made of a conductive film which is formed in the form of an approximate rectangle or a square pattern. The picture electrodes 4 are separated physically and electrically between each other. Each picture electrode 4 is provided with the TFT 6. As a material for the picture electrodes 4, a transparent electrode material can be used as in the transparent electrode 1. For example, a mixture of $In_2O_3$ and $SnO_2$, so-called ITO film, or a film coated with $SnO_2$ or $In_2O_3$ can be used. It is possible to use such ITO film, or a film coated with $SnO_2$ or $In_2O_3$ which are doped with Sn or Sb, and MgO or ZnO can be used.

Needless to say, not only the transparent electrode material, but also a given conductive material such as electrochemically stable metals can be used. Platinum, chrome, aluminum, cobalt, palladium and the like are preferable. In this case, a film made of a good conductor such as a metal film is formed on the support 7 described later. Further, carbon can be used as a common electrode. As a method to support the carbon on the electrode, there is a method wherein printing is made on the substrate face by using a resin as an ink. By using the carbon, price of the electrode can be reduced.

A ratio of a length L of the picture electrode 4, and a distance d between the electrodes (a distance between the picture electrode 4 and the transparent electrode 1) is preferably 3:1 or more. The reason for it will be described later.

The TFT 6 is an active device to perform a switch function for the corresponding picture electrode 4. The active matrix method wherein the picture electrode 4 is driven by using the TFT 6 in this way is very effective to prevent cross talks between picture elements. The TFT 6 is, for example, formed to occupy one corner of the picture electrode 4 as shown in FIG. 1, but the picture electrode 4 and the TFT 6 can be overlapped in the direction of the layers. A construction of the TFT 6 can be selected as appropriate based on conditions such as a material for the support 7 described below.

The picture electrode 4 and the TFT 6 are formed on the support 7 which is provided on the rear side. The support 7 is not necessarily transparent, and a substrate or a film which can surely support the picture electrode 4 and the TFT 6 can be used. For example, a glass substrate such as a silica glass plate and a soda lime glass plate, a ceramic substrate, a paper substrate, and a wood substrate can be used. However, as a synthetic resin substrate, ester such as polyethylene naphthalate and polyethylene terephthalate; cellulosic ester such as polyamide, polycarbonate and acetylcellulose; fuluoride polymer such as polyvinylidene fluoride and polytetrafluoroethylene-cohexafluoro propylene; polyether such as polyoximethylene; polyolefin such as polyacetal, polystyrene, polyethylene, polypropylene, and methyl pentene polymer; and polyimide such as polyimide-amide and polyetherimide can be used as well. In the case where these synthetic resins are used for a support, the support can be made in the form of a rigid substrate which is hard to be bent, and can be also made in the structure of a flexible film.

At a rim part of this display unit, a sealing resin part which supports the both supports 5 and 7 is formed (not shown in the figure). The both supports 5 and 7, and the transparent electrode 1, the display layer 2, the ion conductive layer 3, the picture electrodes 4, and the TFTs 6 which are provided between the supports 5 and 7 are surely supported by this sealing resin part.

Figure 2:
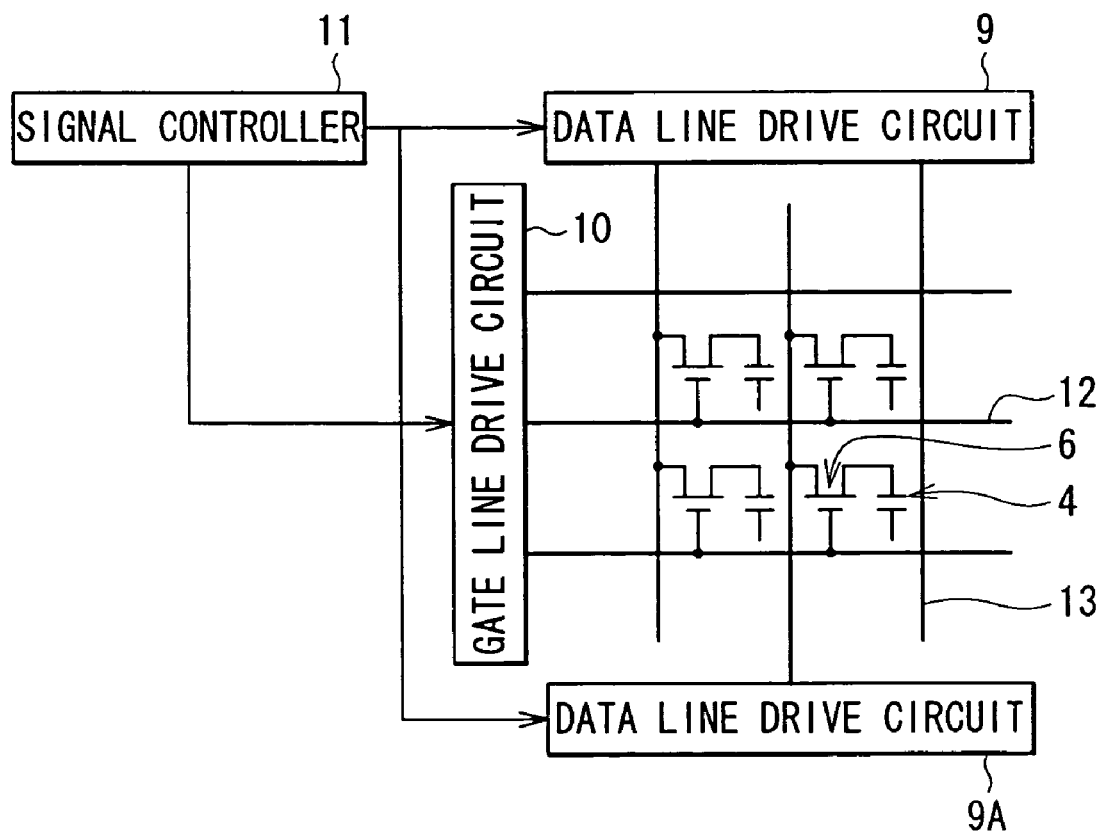
FIG. 2 is a block diagram of the display unit illustrated in FIG. 1.

FIG. 2 is a block diagram showing the display unit with the electrochromic method as shown in FIG. 1. The picture electrodes 4 corresponding to each picture element and the TFTs 6 corresponding to them are arranged in the form of a matrix, and a capacity facing electrode side is a common electrode. A gate line (a scanning line wiring) 12 is connected to a gate electrode of the TFT 6, and a data line (signal line wiring) 13 is connected to one side of the source and drain of the TFT 6. The other side of the source and drain of the TFT 6 is connected to the picture electrode 4. The gate lines 12 are connected to a gate line drive circuit 10, and the date lines 13 are connected to a data line drive circuits 9, 9A. The gate line drive circuit 10 and the data line drive circuits 9, 9A are connected to a signal controller 11.

Next, a driving method for the display unit according to this embodiment will be described with reference to FIGS. 3 and 5.

This display unit can be driven by, for example, a line sequential drive. Namely, when the gate line drive circuit 10 sequentially applies selective pulses to the gate line 12 during 1 frame, simultaneously the data line drive circuits 9, 9A sequentially apply display signals corresponding to the selected gate line 12 to each data line 13. Through the TFT 6 connected to the selected gate line 12, the display signals applied to the data line 13 are written from the picture electrode 4 side, and characters, images or the like are displayed on the display layer 2.

As for writing, by supplying a certain amount of current for a given time corresponding to the display signals with, for example, so-called pulse drive, a drive current having electrical charges corresponding to a coloration density (current multiplied by time) can be surely applied to each picture element of the display layer 2, and a stable contrast can be obtained.

Here, electrical charges of the drive current are preferably not over twice as much as the electrical charges at which coloration of a part of the display layer 2 which is sandwiched between the picture electrodes 4 and the transparent electrode 1 provided with the drive current is saturated. The reason for it is that even when the drive current applied to one of the picture electrodes 4 flows and makes coloration all over the display layer 2 which has a common potential due to the transparent electrode 1, a current distribution is the highest in the area just above the picture electrode 4 to which the drive current is applied, and more distant from that part it is, more lower the current distribution is. Therefore, electrical charges flowing into adjacent picture elements or peripheral picture elements of the display layer 2 can be suppressed to be lower. Consequently, the amount of accumulated electrical charges of the display layer 2 can be controlled so that extra coloration of the display layer 2 can be reduced, and a major effect on the practically adjacent picture elements can be avoided, and therefore quality with no problems as a display device can be obtained. It is further preferable that electrical charges of the drive current is suppressed not over the electrical charges at which coloration of a part of the display layer 2, which is sandwiched between the picture electrodes 4 and the transparent electrode 1 provided with the drive current is saturated.

Figure 3:
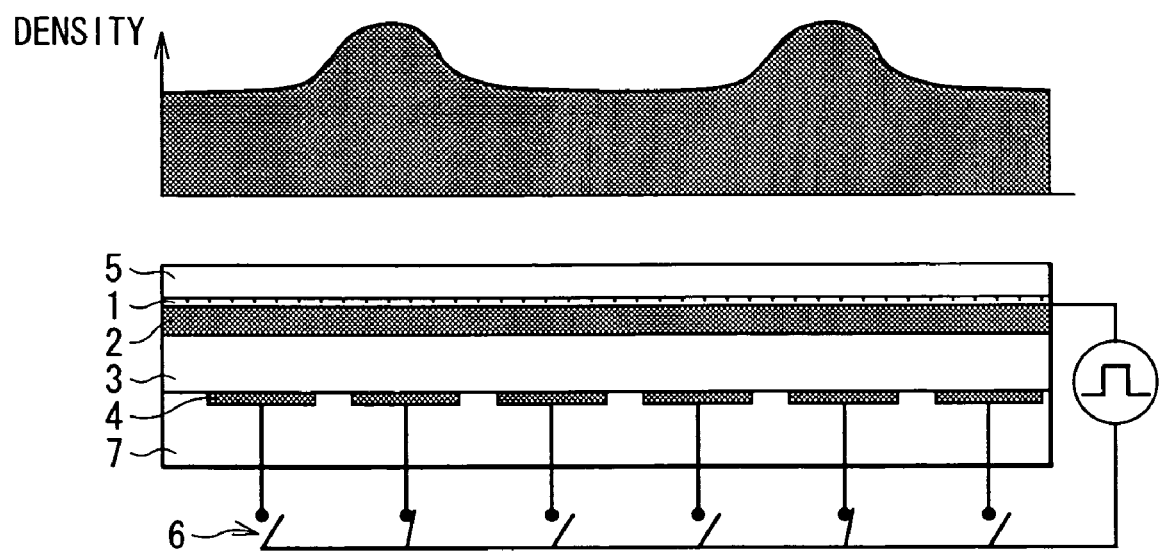
FIG. 3 is a figure to explain an example of driving method for the display unit illustrated in FIG. 1.

FIG. 3 shows in a standard model an example of a coloration density distribution of six picture elements arranged along one gate line 13, in the case where, as described above, drive is performed by limiting electrical charges to a certain value and under. When the TFT 6 is selectively turned on corresponding to an image, for example, a pulse current is supplied to the second picture electrode 4 from the left and the second picture electrode 4 from the right, the whole display layer 2 is colored since the display layer 2 has a common potential due to the transparent electrode 1; but the coloration densities in the areas just above the second picture electrodes 4 from the left and right become higher compared to those of others. In the display unit of this embodiment, since picture elements are not defined by the picture electrodes 4, the picture elements may be a little indistinct. However, since one data of image information is given to one picture element, lack of information amount does not occur even when their boundaries are indistinct. It would rather result in good display for photos or the like, since boundaries between picture elements are not outstanding.

Further, from the view point of a configuration of the display unit, a ratio of the length L of the picture electrode 4 and the distance d between the electrodes (the distance between the picture electrode 4 and the transparent electrode 1) is preferably 3:1 or more. The reason for it is, in this manner, a drive current is prevented from spreading in the ion conductive layer 3, and effect on the adjacent picture elements can be reduced.

Figure 4:
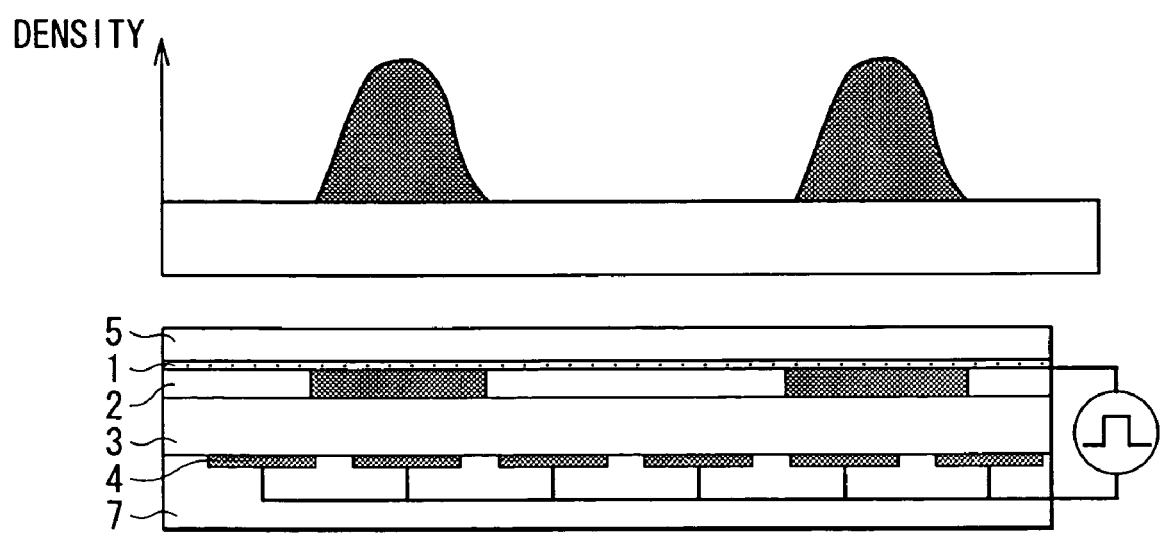
FIG. 4 is a figure to explain other example of driving method for the display unit illustrated in FIG. 1.

As other method to adjust the amount of accumulated electrical charges of the display layer 2, a direction of the drive current can be inverted. For example, as shown in FIG. 3, when coloration occurs all over the display layer 2 due to application of the drive current, a current whose direction is inverted compared to the direction of the drive current can be supplied to all the picture electrodes 4 at once, every time writing during one frame is finished. In this manner, as shown in FIG. 4, a certain amount of coloration can be deducted equally from the whole display layer 2, and coloration area returns to the originally intended size. Here, in the case where the amount of electrical charges of the inverted current are larger than the amount of electrical charges of the drive current, displayed images are eliminated, so that electrical charges of the inverted current should be less than the amount of electrical charges of the drive current. Namely, time for applying the inverted current should be set to being very short compared to time for supplying the drive current.

Figure 5:
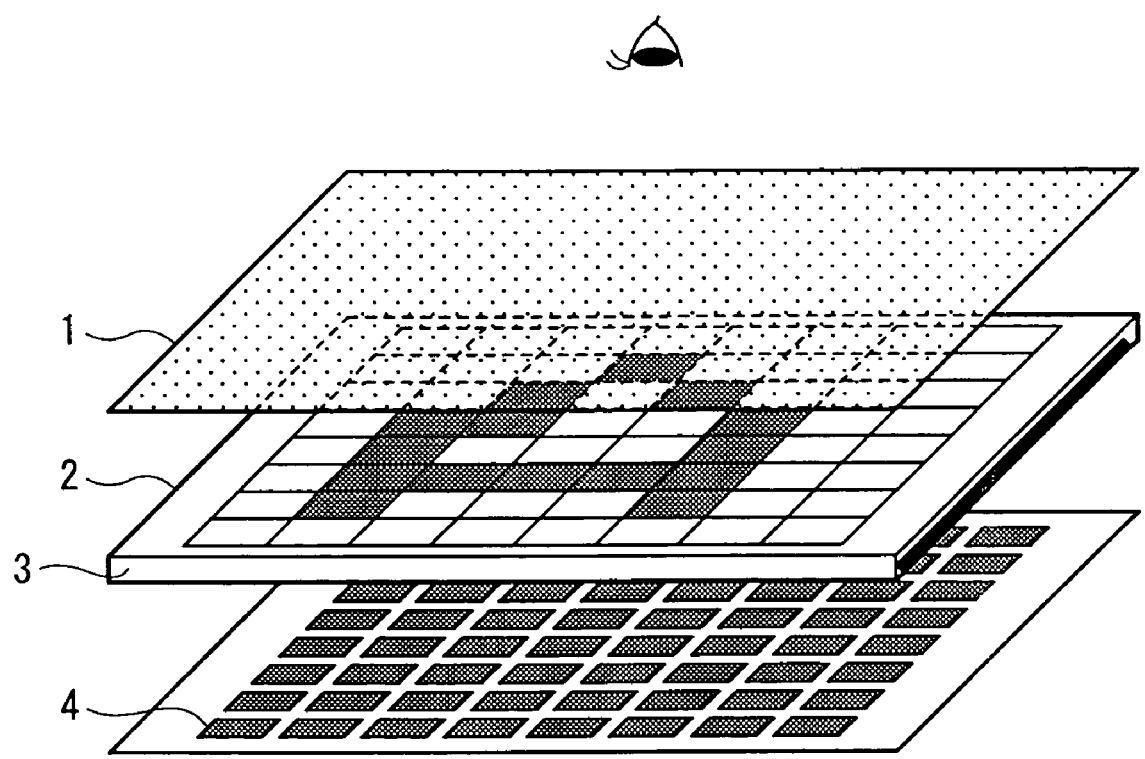
FIG. 5 is an exploded perspective view showing in a standard model a display condition according to the driving method illustrated in FIG. 4.

FIG. 5 is an exploded perspective view showing in a standard model a display condition when a direction of the drive current is inverted for all the picture electrodes 4 as shown in FIG. 4. Patterns of the picture electrodes 4 and the TFTs 6 on the base cannot be seen, and only characters are visible on the white background. This is especially suitable to display characters which require clearness of outlines.

Though the inverted current can be applied to all the picture electrodes 4 at once as shown in FIG. 4, it is also possible to apply the inverted current to the picture electrodes 4 corresponding to outline parts of display at once. In this manner, extra coloration (discoloration) around the picture elements due to spread of the drive current in the ion conductive layer 3 can be eliminated. Consequently, blur and indistinct condition of the picture elements can be remedied, and clear displays become possible.

As above, according to this embodiment, since the picture electrodes 4 are formed on the ion conductive layer 3 on the side opposite to the display layer 2, characters and images displayed by the display layer 2 are viewed from the transparent electrode 1 side, and the picture electrodes 4 and the TFTs 6 are located on the rear side of the display layer 2. Therefore, optical transmittance of the TFT substrate does not matter, and the problem of shadow due to the TFTs 6, wiring electrodes of the gate line 12 and the data line 13 and the like is resolved. Further, since patterns of the picture electrodes 4 and the TFTs 6 are not viewed from the observer side, a real white background is obtained, and a high-quality display can be realized. On the contrary, since in a conventional and ordinary arrangement, an electrochromic display layer is viewed through the TFT side, display becomes dark by a factor of an area occupied by the TFT, resulting in lowered contrast. According to this embodiment, differing from the conventional method, since color change of the display layer 2 is viewed directly (only through the transparent electrode 1), there is no parallax or no effects on the optical transmittance due to the TFT 6, and a bright and high-contrast display can be obtained.

Further, not only an area for the TFTs 6 can be secured maximally and a-Si TFTs and organic TFTs can be utilized, but also the picture electrodes 4 are not necessarily made of a transparent material, and a given electrode material can be used. Furthermore, patterning of the display layer 2 and the transparent electrode 1 is unnecessary, and big manufacturing benefits such as reduction of a number of processes can be obtained.

Further, since the amount of accumulated electrical charges of the display layer 2 is controlled by controlling the amount of electrical charges or directions of the drive current, extra coloration (discoloration) of the display layer 2 is decreased or eliminated even when a drive current is applied and coloration occurs all over the display layer 2 having a common potential due to the transparent electrode 1 or even when a drive current spreads inside of the ion conductive layer 3. Consequently, a major effect on the practically adjacent picture elements can be avoided, and quality with no problems as a display device can be obtained.

In particular, since electrical charges of the drive current are limited to not over twice as much as the electrical charges at which coloration of a part of the display layer 2 which is sandwiched between the picture electrodes 4 supplied with the drive current and the transparent electrode 1 is saturated, namely totally reacted, the electrical charges which flow in the adjacent or peripheral picture elements to the display layer 2 can be suppressed. In result, major effect on the practically adjacent picture elements can be avoided, and it would rather result in good display for e.g. photos since boundaries between picture elements are not outstanding.

Further, specifically, since a ratio of the length L of the picture electrode 4 and the distance d between the electrodes (the distance between the picture electrode 4 and the transparent electrode 1) is set to 3:1 or more, spread of the drive current in the ion conductive layer 3 is suppressed, and effects on the adjacent picture elements can be reduced.

Further, since a direction of the drive current is inverted, the electrical charges leaked to the peripheral picture elements are swept out, so that characters, images and the like can be satisfactory displayed on the display layer 2, and a bright and parallax-free reflective display can be realized.

Specifically, since the inverted current is supplied to all the picture electrodes 4 at once, a certain amount of coloration can be deducted equally from the whole display layer 2, and a coloration area returns to the originally intended size. Therefore, patterns of the picture electrodes 4 and the TFTs 6 on the base are not seen, and only characters are visible on the white background. This is especially suitable to display characters requiring clearness of outlines.

[Modification]

Figure 6:
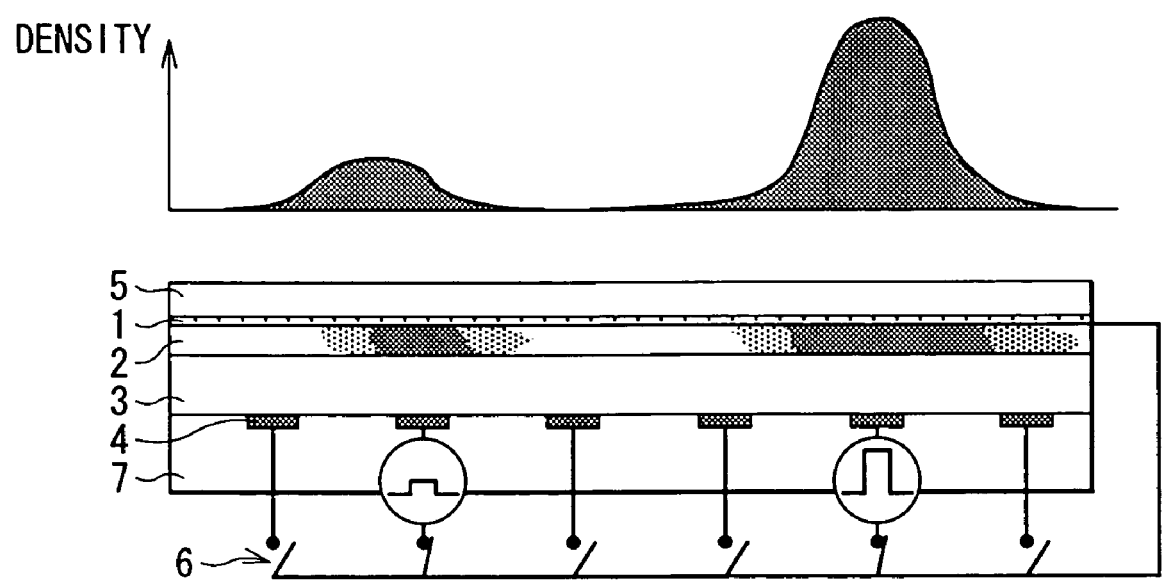
FIG. 6 is a view showing a modification of the driving method according to the first embodiment of the invention.

FIG. 6 is a view showing a modification of the driving method for the foregoing first embodiment. It is needless to say that gradation display to change coloration density of each picture element is possible by modifying the current supply time in the first embodiment. In this modification, the gradation display is made by modifying a coloration area of each picture element of the display layer 2, in other words, by using so-called area gradation. In the case that the display layer is formed on the picture electrode as conventional, a coloration area is determined by the electrode area of the picture electrode. However, according to this modification, by using coloration spread due to spread of the drive current in the ion conductive layer 3, the area gradation display becomes possible.

In this modification, it is preferable that the length L of the picture electrode 4 is shorter than in the first embodiment, in order to actively use the spread of the drive current and achieve a moderately clear display.

[Second Embodiment]

Figure 7:
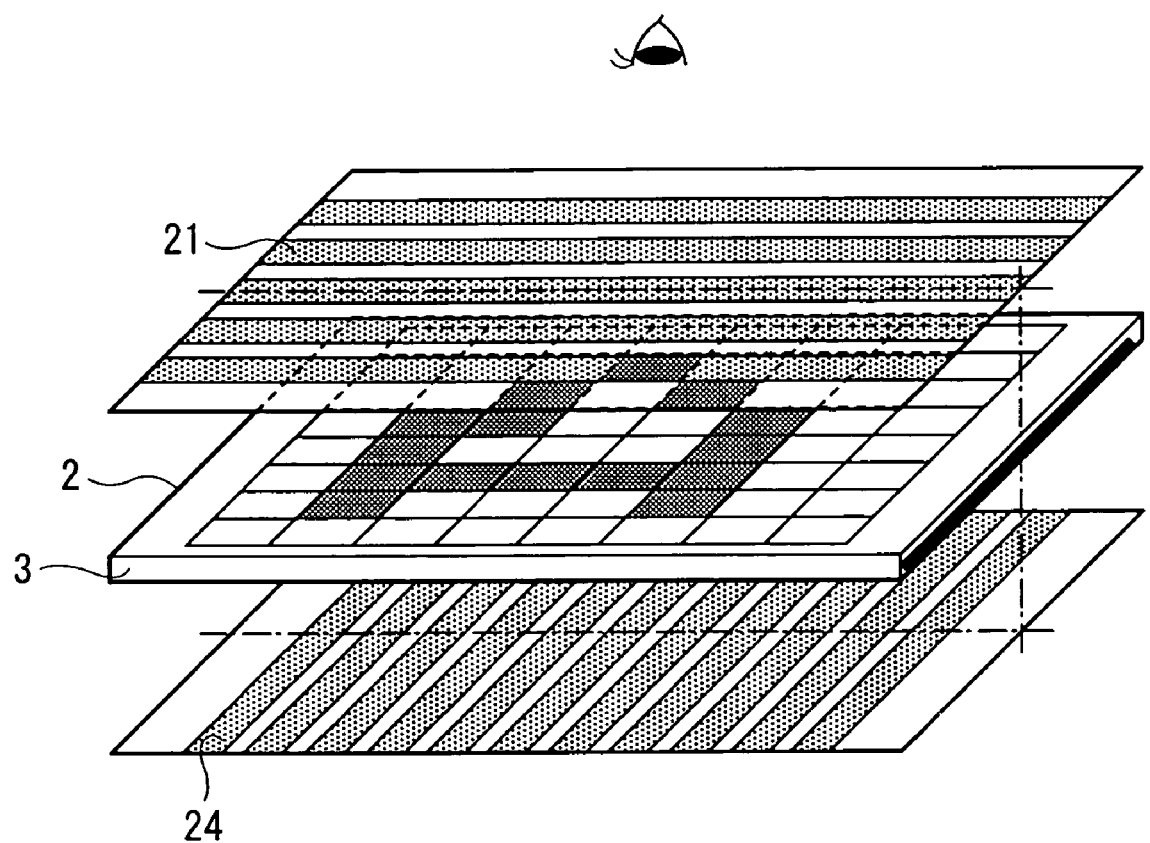
FIG. 7 is an exploded perspective view showing in a standard model a configuration and a display condition of a display unit according to a second embodiment of the invention.

FIG. 7 is an exploded perspective view showing in a standard model a configuration and a display condition of a display unit according to a second embodiment of the invention. The display unit of this embodiment is driven by a simple matrix method, and comprises a picture electrode 24 which is formed as a group of strip-shaped electrodes parallel to each other, and a transparent electrode 21 which is formed as a group of strip-shaped transparent electrodes parallel to each other, which is perpendicular to the picture electrode 24. At intersections of the picture electrode 24 and the transparent electrode 21, picture elements are arranged. Respective materials for the transparent electrode 21 and the picture electrode 24 are the same as those for the transparent electrode 1 and the picture electrode 4 in the foregoing first embodiment. Since components other than the transparent electrode 21 and the picture electrode 24 are the same as those in the foregoing first embodiment, the same symbols are applied to the same components and descriptions for them are omitted. The transparent electrode 21 is formed on the transparent support 5 (not shown in FIG. 7. Refer to FIG. 1), and the transparent support 5 is arranged on the transparent electrode 21 on the side opposite to the display layer 2. The picture electrode 24 is formed on the support 7 (not shown in FIG. 7. Refer to FIG. 1), and the support 7 is arranged on the picture electrode 24 on the side opposite to the display layer 2.

In this display unit, in sync with supplying a scanning signal having a pulse width corresponding to a scanning selection period to the transparent electrode 21, a display signal having a pulse width corresponding to a coloration density is supplied to the picture electrode 24. In the case of such simple matrix method, for example, after writing for every line of the transparent electrode 21, a direction of the drive current is inverted and the current inverted opposite to the direction of the drive current is applied to the whole lines in the same manner as described in the first embodiment with reference to FIG. 4. In this way, outlines become clear, and a display of good images and characters becomes possible. Application of the inverted current can be performed for every line, or for the all lines of the transparent electrode 21 after writing for one frame is finished. In view of a cross section along a given line of the transparent electrode 21 (single dotted line of FIG. 7), its operation principle is similar to that of the active matrix method.

According to this embodiment, since the simple matrix drive, which has been conventionally difficult as a matter of fact due to cross talk, can be adopted in the current drive type electrochromic display unit, an electrochromic display unit with further lower cost and excellent image quality can be provided.

[Third Embodiment]

Figure 8:
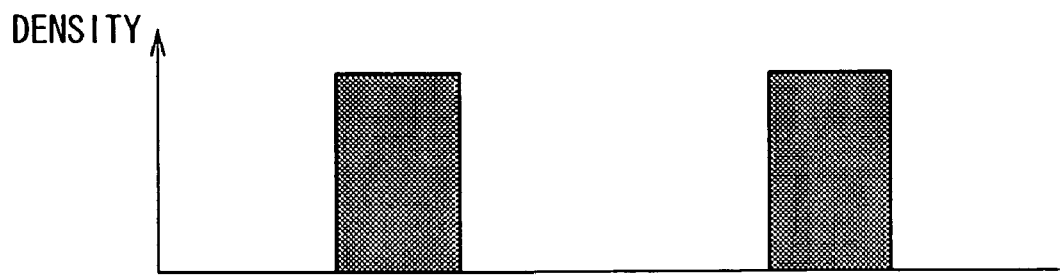
FIG. 8 is a view showing an outline configuration and a coloration density distribution of a display unit according to a third embodiment of the invention.
Figure 8:
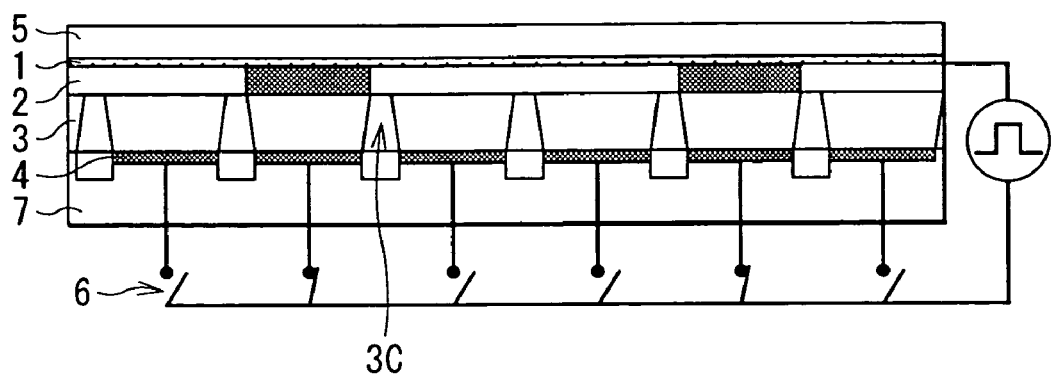

FIG. 8 is a view showing an outline configuration of a display unit according to a third embodiment of the invention, and showing an example of a coloration density distribution of six picture elements arranged along one gate line 13 in a standard model. This display unit has the same configuration as in the display unit of the first embodiment shown in FIG. 1 except that grooves 3C are provided on the ion conductive layer 3 made of a solid electrolyte by selectively eliminating areas between picture elements. Therefore, the same symbols are applied to the same components, and detailed descriptions for them are omitted. In this display unit, since the active matrix drive using the TFT 6 is adopted as in the display unit of the first embodiment, and its driving method is the same as the driving method described based on FIGS. 3 and 4, its detailed description is omitted.

The grooves 3C provided on the ion conductive layer 3 are, for example, void parts, and the ion conductive layer 3 is divided for every picture element by the grooves 3C. Therefore, for example, in the case where a drive current is only applied to the second picture electrodes 4 from the left and the right so that they have the same electrical charges as in FIG. 3, the drive current focuses on the areas above the picture electrodes 4 as shown in a coloration density distribution graph of FIG. 8 and a clear display becomes possible.

As a concrete technique to selectively eliminate the ion conductive layer 3 to form the grooves 3C and divide the ion conductive layer 3 spatially, sand blast method, laser process method and the like can be listed. The sand blast method is the technique to partly shave a solid material by rapidly spraying gas such as air containing fine powders such as silicon dioxide from a fine nozzle. When the picture electrodes 4, or a mask material to form the picture electrodes 4 and a thickness of the mask material is appropriately selected, self-aligning shaving of the ion conductive layer 3 between the picture elements is possible by using the above as a mask.

The laser process is the technique wherein high polymer is locally evaporated by using, for example, a strong ultraviolet laser to form a void. As in the foregoing sand blast method, when the picture electrodes 4, or a mask material to form the picture electrodes 4 and a thickness of the mask material is appropriately selected, self-aligning laser process can be performed by using the above as a mask against the ultraviolet laser. It is also possible to form a sequential long groove by forming a line-shaped beam by using a light transmittance type mask and a cylindrical lens on the slit, and by scanning the beam in parallel. Examples of such laser for microfabrication include an ultraviolet pulse laser. Though a carbon dioxide gas laser and a YAG fundamental wave infrared laser can be used, with such laser, it is difficult to perform microfabrication to about 50 $\mu$m or under since materials are scattered due to dissolution and boiling. By using the ultraviolet laser, chemical bonding can be directly cut, and high-precision process with a little residue is possible.

Concrete examples of the laser used are as follows:

1) Excimer Laser (Pulse width: 10 to several 10 ns, cycle frequency: to 200 Hz)

XeF: 351 nm, XeCl: 308 nm (for silicone anneal), KrF: 248 nm, ArF: 193 nm.

2) Q Switch YAG Laser (Pulse width: several ns, cycle frequency: to 10 Hz/lamp excitation; to 10 kHz/LD excitation)

Threefold wave: 355 nm, fourfold wave: 266 nm

Process energy density of 500 mJ/cm$^2$ (per pulse) or more is required, and shaving of about 0.1 to 1 $\mu$m per 1 pulse is available. Available shaving depth is determined by an absorption coefficient and a power. Among the foregoing lasers, the KrF laser is suitable in terms of efficiency, output, and stability. A process width is about 5 $\mu$m. When a further microfabrication, a process for the one whose wavelength has a short absorption edge (inorganic oxide and the like), clean process (in the case of organic matter, the longer the wavelength is, the more soil due to carbon or the like is applied) and the like are necessary, it is preferable to use the ArF laser, the YAG fourfold wave and the like.

In order to prevent the adhesion of the carbon, it is also effective to radiate the laser while spraying oxygen gas. In order to process in the anaerobic atmosphere and prevent re-adhesion of the scattered objects, it is also possible to radiate the laser in the vacuum or He gas atmosphere.

According to this embodiment, since the ion conductive layer 3 is divided for every picture element by the grooves 3C, the void parts provided in the areas between the picture elements, a drive current does not spread in the ion conductive layer 3 and the drive current focuses on areas 3A above the picture electrodes 4, so that a clear display becomes possible. In addition, since there is no need to consider spread of the drive current in the ion conductive layer 3, the distance d between the electrodes (the distance between the picture electrode 4 and the transparent electrode 1) can be further shortened, and it can be expected that a thickness of the display unit will be reduced.

[Fourth Embodiment]

Figure 9:
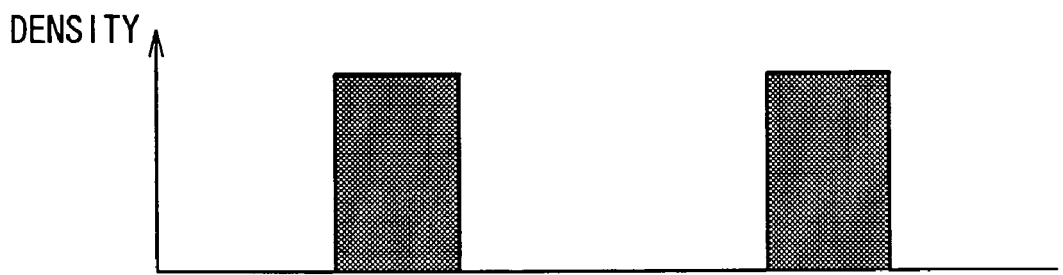
FIG. 9 is a view showing an outline configuration and a coloration density distribution of a display unit according to a fourth embodiment of the invention.
Figure 9:
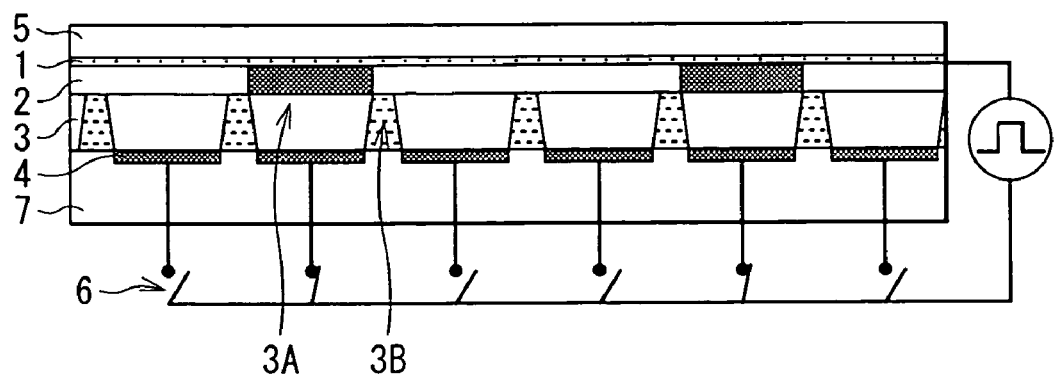

FIG. 9 is a view showing an outline configuration of a display unit according to a fourth embodiment of the invention, and showing an example of a coloration density distribution of six picture elements arranged along one gate line 13 in a standard model. In the third embodiment, the ion conductive layer 3 is divided spatially by selective elimination. In this embodiment, the ion conductive layer 3 is divided for every picture element by selectively lowering or selectively raising ion conductivity of the ion conductive layer 3. Namely, the display unit of this embodiment has the same configuration as in the display unit of the first embodiment shown in FIG. 1 except that the ion conductive layer 3 is composed so that an ion conductivity of the areas 3A corresponding to the picture elements is higher than an ion conductivity of areas 3B between the picture elements. Therefore, the same symbols are applied to the same components, and detailed descriptions for them are omitted. Further, in this display unit, the active matrix drive using the TFT 6 is adopted as in the display unit of the first embodiment, and its driving method is the same as in the description based on FIGS. 3 and 4, so that its detailed descriptions are omitted.

Specifically, for example, in the case where a conductive polymer is formed by polymerisation in preparation of a solid electrolyte, the resistance in that area can be raised or lowered by partly causing chemical change such as cross-link and the like by ultraviolet. In the case of using lights, when the picture electrodes 4, or a mask material used to form the electrodes 4 and its thickness is appropriately selected, self-aligning method by using them as a mask can be applied, and big advantages are obtained in terms of manufacturing cost and yield.

According to this embodiment, by lowering the ion conductivity in other words, by raising the resisitivity, of the areas 3B between the picture elements than the ion conductivity of the areas corresponding to the picture elements, namely, of the areas 3A located above the picture electrodes 4, spread of the drive current in the ion conductive layer 3 can be suppressed, and blur of the picture elements can be excluded.

Concrete examples of the invention will be described below based on experimental results. It goes without saying that the invention, however, is not to be limited to such examples.

EXAMPLE 1

(Production of a Display Pole)

Figure 10:
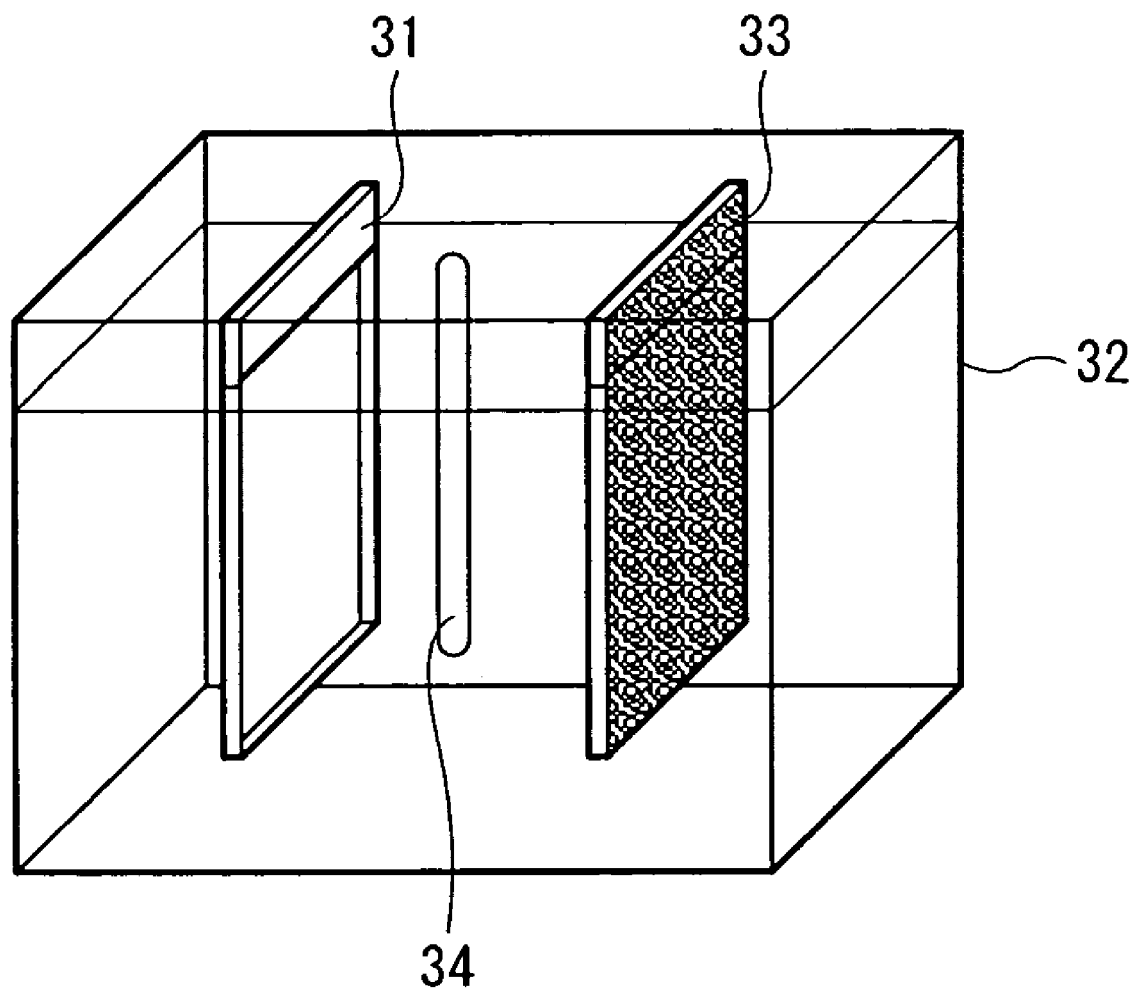
FIG. 10 is an outline oblique perspective view showing a configuration of an electrolytic bath used for electrolytic polymerization in an example of the invention.

After forming an ITO film uniformly over a glass substrate with a thickness of 1.1 mm and dimensions of 10 cm×10 cm, a lead part was formed at the edge part of the substrate by a known method. As shown in FIG. 10, this glass substrate 31 was located in a glass bath for electrolytic polymerization 32. An electrolytic solution in the glass bath 32 was obtained by dissolving tetraethyl ammonium tetrafluoro borate of 1 mol/l and pyrrole of 1 mol/l in propylene carbonate. In addition to the glass substrate 31, a platinum substrate 33 as a counter electrode and a silver wire 34 as a reference electrode were arranged in the glass bath for electrolytic polymerization 32 as shown in FIG. 10.

Subsequently, from an unshown drive circuit, a constant current of 2 mA was entirely applied until a current-carrying quantity became 3C (30 mC/cm$^2$). On the ITO, an electrolytic polymerisation film of polypyrrole showing black color caused by doping of tetrafluoro borate anion was formed. Then, the glass substrate 31 was arranged in a glass bath containing an electrolytic solution obtained by dissolving tetraethyl ammonium tetrafluoro borate of 1 mol/l in propylene carbonate, a current of −1 mA was applied until a current-carrying quantity became 0.8 C (8 mC/cm$^2$), and ions doped in polypyrrole during polimerisation were dedoped. Color of the electrolytic polymerisation film of polypyrrole changed to slightly yellowish transparent color.

(Preparation and Application of a Polymer Solid Electrolyte)

8 parts by weight from polyvinylidene fluoride with molecular weight of about 0.35 million and tetraethyl ammonium tetrafluoro borate of 1 mol were dissolved in propylene carbonate. Subsequently, titanium oxide of 25 parts by weight with its average particle diameter of 0.1 μm was added to the above mixture, and the resultant was uniformly dispersed by an ultrasonic homogenizer. The foregoing substrate was spin coated with this polymer solution under conditions of 1,000 rpm for 4 sec, and then 3,000 rpm for 30 sec. The resultant was dried under reduced pressure at 110° C. in 0.1 Mpa for 1 hour. Immediately after gelation, the resultant was affixed to a drive pole described later, and a polymer solid electrolyte was formed between two electrodes as an ion conductive layer. Then, the edge of the affixed part was sealed by using an epoxy ultraviolet curing resin (Photolec made by Sekisui Chemical Co., Ltd.) as a sealant.

(Production of a Drive Pole)

On a glass substrate with a thickness of 1.1 mm and dimensions of 10 cm×10 cm, an ITO film and TFTs arranged two-dimensionally in 150 μm pitch were produced by a known method. Subsequently, a lead part connecting to the drive circuit was produced on the glass substrate by a known method.

(Evaluation of the Drive and Display Characteristics)

Black display and colorless (white) display were switched by oxidizing the display pole with an electrical quantity of 2 μC per 1 picture element during coloring and reducing the display pole with the same electrical quantity during discoloring by the known active matrix drive circuit.

Reflectance in colorless (white) condition was 70%, and optical density (OD) of the display part in coloring (black) condition was about 1.3 (reflectance of 5%). Therefore, as a contrast of the reflectances, 1:14 was obtained.

On the 7th day after being kept in coloring condition and left with its circuit open, the optical density of the display part was about 1.0, and memory characteristic existed. In the case where cycles of coloring and discoloring were repeated, the cycle number of times until black density during coloring became 1.0 or less was about 8 million.

EXAMPLE 2

In order to examine how much blur occurs outside of the picture elements, polypyrrole was deposited on a line electrode (width of 4 mm) as a first electrode and on an allover electrode as a second electrode under the same conditions as in the Example 1. An electrochromic display layer was made of polypyrrole (polymerisation conditions: constant current of 2 mA, synthetic electrical quantity of 30 mC/cm$^2$), an electrolyte was made of tetraethyl ammonium tetrafluoro borate, and the thickness of an ion conductive layer was 200 μm.

Based on a response speed of the part where the electrodes are formed on the both substrates (polypyrrole was also formed on the both electrodes), a response speed of the part at a distance of 1.1 mm from the electrodes was compared. The response speeds were measured under a transmission microscope, and detected with photomultiplier strength. The drive wave form was rectangle of 0.1 Hz, and the impressed voltage was ±1 V. Consequently, the response speed of the polypyrrole was 190 ms at the part where there were the electrodes on the both substrates, and the response speed of the polypyrrole at the part where there was the electrode only on one substrate, at a distance of 1.1 mm from the edges where there were the electrodes on the both substrate was longer than the above speed by 160 ms.

While the invention has been described with reference to the embodiments and the examples, the invention is not limited to the foregoing embodiments and examples, and various modifications may be made. For example, in the first embodiment, the method to limit the electrical charges of the drive current to a certain value or less as shown in FIG. 3 and the method to invert the direction of the drive current as shown in FIG. 4 were described. However these methods can be used at the same time, and without mentioning, only one of them can be used.

Further, for example, in the third embodiment, the grooves 3C were void parts. However, it is possible to fill an insulation material in the grooves 3C.

In addition, for example, in the third and the fourth embodiments, the cases of the active matrix drive by the TFT were described as examples. However, the configuration wherein the ion conductive layer 3 is divided for every picture element as in the third and the fourth embodiments can also be adopted for the case of the simple matrix drive.

As described above, according to the display unit of the invention, since a plurality of independent electrodes are formed on the ion conductive layer on the side opposite to the display layer, characters and images displayed by the display layer are viewed from the transparent electrode side, and the plurality of electrodes and the TFTs connected to the plurality of electrodes as active devices and the like are located on the rear side of the display layer. Therefore, optical transmittance of the TFT substrate becomes unconsidered and the problem of shadow due to the TFT, a wiring electrode or the like is solved. In addition, since patterns of the plurality of electrodes and the TFTs are not viewed from the observer side, the display layer becomes a real white background, and a high-quality display can be realized. On the contrary, in the conventional and general arrangement, since the electrochromic display layer is viewed through the TFT side, the display becomes dark by a factor of the area occupied by the TFT, resulting in lowered contrast. According to the invention, different from the conventional method, color change of the display layer is directly (only through the transparent electrode) viewed, so that there is no parallax or no effects on optical transmittance due to the TFT, and a bright and high-contrast display can be obtained.

Further, not only areas for the TFTs can be secured maximally and a-Si TFTs and organic TFTs can be utilized, but also the plurality of electrodes are not necessarily made of a transparent material, and a given electrode material can be used. Furthermore, patterning of the display layer and the transparent electrode is unnecessary, and big manufacturing benefits such as reduction of a number of processes can be obtained.

Particularly, according to the display unit of one aspect of the invention, since the ion conductive layer is divided for every picture element by the groove parts provided in the areas between the picture elements, the drive current does not spread in the ion conductive layer, and focuses on the areas located above each of the plurality of electrodes, resulting in a clear display.

Further, according to the display unit of another aspect of the invention, the ion conductive layer is composed so that the ion conductivity in the area corresponding to the picture element is higher than the ion conductivity in the area between picture elements. Therefore, spread of the drive current is suppressed, and blur of the picture elements becomes unconsidered. Consequently, the display layer is colored only corresponding to the electrodes supplied with the drive current, and a clear display becomes possible.

Further, according to the display of still another aspect of the invention, the plurality of electrodes is a group of strip-shaped electrodes parallel to each other, the transparent electrode is a group of strip-shaped transparent electrodes parallel to each other which is perpendicular to the above plurality of electrodes, and the picture elements are arranged at intersections of the strip-shaped electrodes and the strip-shaped transparent electrodes. Therefore, the simple matrix drive, which has been practically difficult to use due to cross talk, can be adopted. Consequently, a display unit with further lower cost and excellent image quality can be provided.

In addition, according to the display unit of still another aspect of the invention, in the case of the active matrix drive, the ratio of the length of the plurality of electrodes and the distance between the transparent electrode and the plurality of electrodes is set to 3:1 or more, and in the case of the simple matrix drive, the ratio of the width of the strip-shaped electrode comprising the plurality of electrodes and the distance between the transparent electrode and the plurality of electrodes is set to 3:1 or more. Therefore, spread of the drive current in the ion conductive layer is suppressed, and effects on the adjacent picture elements can be reduced.

According to the driving method for the display unit of the invention, since the accumulated electrical charges of the display layer is controlled by controlling electrical charges or directions of the drive current, extra coloration (discoloration) of the display layer is decreased or eliminated even when coloration occurs since a drive current is applied all over the display layer having a common potential due to the transparent electrode or even when a drive current spreads inside of the ion conductive layer. Consequently, a major effect on the adjacent picture elements can be avoided practically, and quality with no problems as a display device can be obtained.

Specifically, according to the driving method for the display unit of one aspect of the invention, since electrical charges of the drive current is limited to not over twice as much as the electrical charges wherein discoloration or coloration of the part of the display layer which is sandwiched between the plurality of electrodes and the transparent electrode provided with the drive current is saturated, namely totally reacted, the electrical charges which flow in the adjacent or peripheral picture elements to the display layer can be suppressed. In result, major effect on the adjacent picture elements can be avoided practically, and it would rather result in good display for e.g. photos since boundaries between picture elements are not outstanding.

Further, according to the driving method for the display unit of another aspect of the invention, since a direction of the drive current is inverted, characters, images and the like can be well displayed on the display layer, and a bright and parallax-free reflective display is realized.

Further, according to the driving method for the display unit of still another aspect of the invention, since the inverted current is supplied to all the plurality of electrodes at once, a certain amount of coloration can be deducted uniformly from whole the display unit, and a size of coloration area returns to the originally intended size. Therefore, only the areas corresponding to the electrodes provided with the drive current are colored, patterns of the plurality of electrodes and the TFTs on the base are not visible, and only characters are viewable on the white background. It is especially suitable for the case to display characters which requires clearness of outlines.

In addition, according to the driving method for the display unit of still another aspect of the invention, since the current whose direction is inverted is simultaneously supplied to the electrodes among the plurality of electrodes, corresponding to the outline parts of the display, extra coloration (discoloration) around the picture elements due to spread of the drive current in the ion conductive layer can be eliminated. Consequently, blur or indistinct condition of the picture elements can be remedied, and a clear display becomes possible.

Obviously many modifications and variations of the present invention are possible in the light of the above teachings. It is therefore to be understood that within the scope of the appended claims the invention may be practiced otherwise than as specifically described.

The invention claimed is:

1. A display unit comprising:
   a transparent electrode;
   a display layer formed on the transparent electrode which discolors corresponding to accumulated electrical charges; and
   an ion conductive layer formed on the display layer on the side opposite to the transparent electrode, wherein:
   a plurality of independent electrodes are formed on the ion conductive layer on the side opposite to the display layer,
   the plurality of independent electrodes are arranged corresponding to picture elements, and connected to respectively corresponding thin film transistors,
   the transparent electrode is a common electrode,
   a ratio of a length of each independent electrode and a distance between the transparent electrode and the plurality of independent electrodes is 3:1 or more, and
   the ion conductive layer is composed so that ion conductivity of an area corresponding to the picture element is higher than ion conductivity of an area between the picture elements.

* * * * *